United States Patent [19]

Ogino et al.

[11] Patent Number: 4,924,319
[45] Date of Patent: May 8, 1990

[54] BOARD-WRITING APPARATUS

[75] Inventors: Yoshitaka Ogino, Kawasaki; Ryozo Yanagisawa, Matsudo; Noboru Koumura, Narashino; Masanori Nanamura, Kawasaki, all of Japan

[73] Assignee: Canon Kabushiki Kaisha, Tokyo, Japan

[21] Appl. No.: 16,652

[22] Filed: Feb. 19, 1987

[30] Foreign Application Priority Data

| Feb. 19, 1986 | [JP] | Japan | 61-34774 |
| Apr. 9, 1986 | [JP] | Japan | 61-52168[U] |
| Apr. 9, 1986 | [JP] | Japan | 61-52169[U] |
| Apr. 16, 1986 | [JP] | Japan | 61-86004 |

[51] Int. Cl.$^5$ .............................................. H04N 1/10
[52] U.S. Cl. ..................................... 358/296; 358/494
[58] Field of Search ................. 358/296, 285, 286, 293

[56] References Cited

U.S. PATENT DOCUMENTS

| 3,117,182 | 1/1964 | Hell et al. . | |
| 4,587,568 | 5/1986 | Takayama et al. . | |
| 4,636,871 | 1/1987 | Oi | 358/286 |
| 4,667,254 | 5/1987 | Araki et al. | 358/293 |
| 4,670,794 | 6/1987 | Araki et al. | 358/293 |

FOREIGN PATENT DOCUMENTS

| 119856A | 9/1984 | European Pat. Off. . |
| 3042885 | 5/1982 | Fed. Rep. of Germany . |
| 2307412 | 11/1976 | France . |
| 57-92973 | 6/1982 | Japan . |
| 59-72860 | 4/1984 | Japan . |
| 1541245 | 2/1979 | United Kingdom . |

Primary Examiner—Clifford C. Shaw
Attorney, Agent, or Firm—Fitzpatrick, Cella, Harper & Scinto

[57] ABSTRACT

The board-writing apparatus of the present invention uses an end-having sheet member as a member for writing and indication. The sheet member is received into a receiving portion by one end thereof being taken up and is taken out for use from the receiving portion as required. The image information on the sheet member is read out by the read-out optical system of the apparatus body by the utilization of the movement of the sheet member into and out of the apparatus. The read-out image information is output as image information by a printer integral with or separate from the apparatus.

7 Claims, 17 Drawing Sheets

BOARD-WRITING APPARATUS

BACKGROUND OF THE INVENTION

1. Field of the Invention

This invention relates to a board-writing apparatus which permits image information to be written on a board-writing member so as to enable the board-writing member to be used in the same manner as a conventional blackboard and permits the image information written on the board-writing member to be recorded.

2. Related Background Art

Recording of the image information of blackboards used in conferences or the like has heretofore resorted to man power and suffered from problems such as erroneous transcription, loss of time and economic loss. So, in recent years, a blackboard endowed with the function of recording such image information, i.e., a so-called electronic board-writing apparatus, has been devised and put into practice, as described in U.S. Pat. No. 4,587,568, etc. However, the electronic board-writing apparatus according to the prior art is of a construction comprising a write-in and display unit using a board-writing member equal in dimensions to the conventional blackboard and a housing for the board-writing member, and thus requires a size substantially equal to that of the conventional blackboard. Furthermore, its unportability leads to its use in limited particular spaces.

SUMMARY OF THE INVENTION

It is an object of the present invention to solve the problem of size peculiar to the electronic board-writing apparatus according to the prior art and to provide a board-writing apparatus which is easy to move or carry.

It is another object of the present invention to provide a board-writing apparatus which is easy to carry and permits a printer for recording to be removably mounted with respect thereto or permits the use of a separate printer.

The board-writing apparatus of the present invention which achieves the above objects has an end-having sheet member having one end as a free end and capable of writing thereon, sheet member supporting means for supporting the sheet member so as to be able to assume a first position in which the other end of said sheet member is wound into and supported on the receiving portion of the body of said apparatus and a second position in which said sheet member is located outside the body of said apparatus from said wound-in position by said free end side of said sheet member being moved, means disposed in facing to the path of movement of said sheet member for reading out by read-out means the image information on the sheet member as it is moved and converting the image information into an electrical signal, and means used to record the image information on a recording material on the basis of said electrical signal.

BRIEF DESCRIPTION OF THE DRAWINGS

FIG. 5 is a timing chart showing the timings of read-out and write-in.

FIG. 20 is a flow chart in a case where the read-out data is shifted in a predetermined direction and written in.

DESCRIPTION OF THE PREFERRED EMBODIMENTS

The present invention will hereinafter be described in detail with respect to some embodiments thereof.

Figure 1:
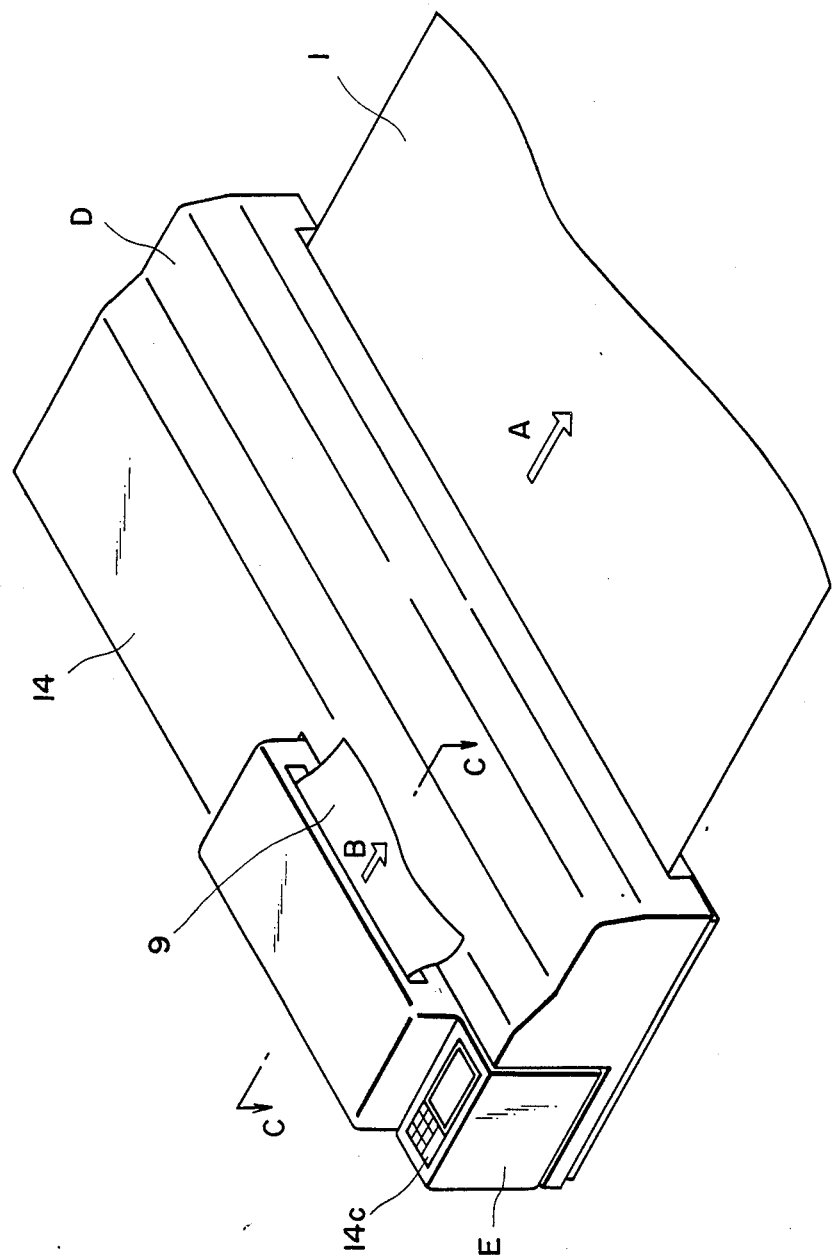
FIG. 1 is a perspective view of the board-writing apparatus of the present invention.
Figure 2:
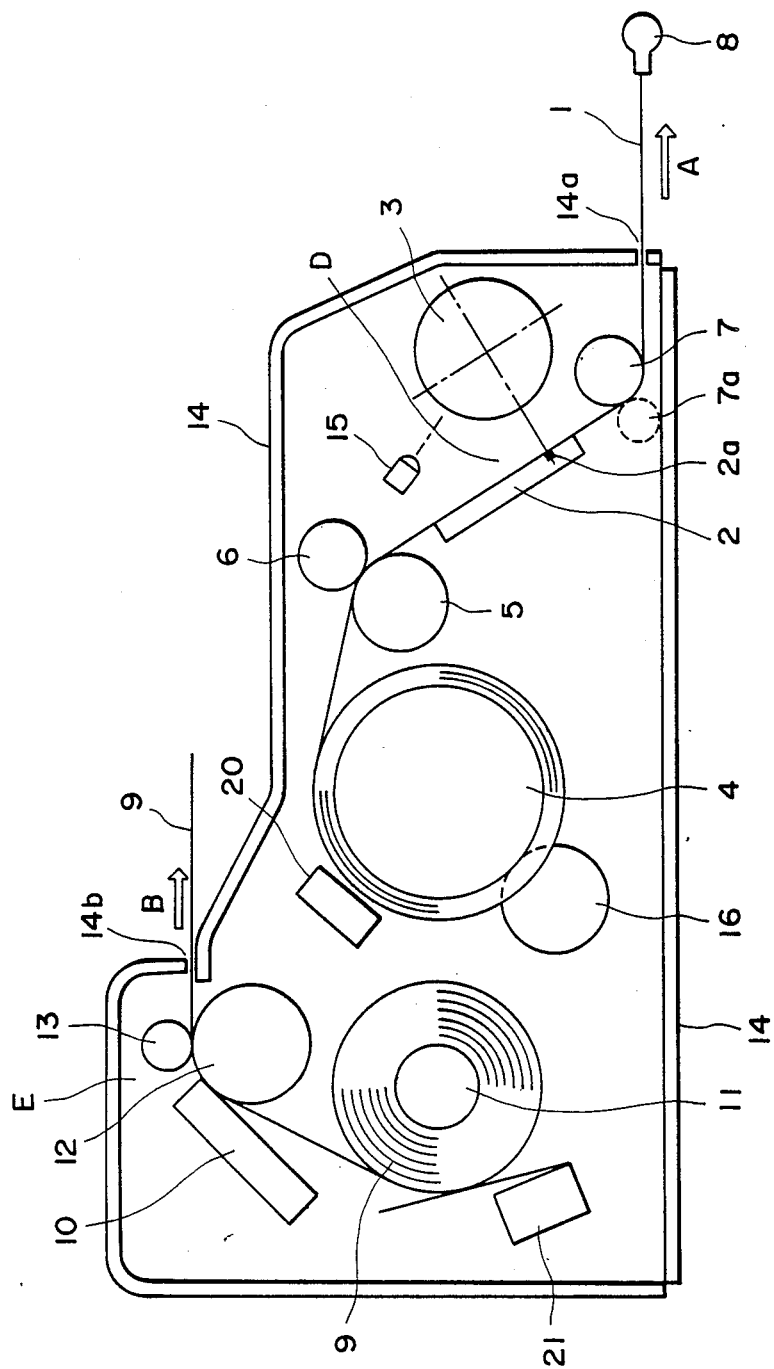
FIG. 2 is a cross-sectional view taken along line C—C of FIG. 1.

FIG. 1 shows a pictorial perspective view of an embodiment of the present invention, and FIG. 2 shows a cross-sectional view of the FIG. 1 apparatus taken along line C—C of FIG. 1. The board-writing apparatus according to this embodiment has a recording means for receiving image information from a read-out means and a printing out the image information.

Referring to FIG. 1, a sheet member 1 capable of writing in is contained in a containing portion within the apparatus when it is not in use, and is taken out in the direction of arrow A to form a board-writing surface when it is used as a board-writing member. When the image information written on the sheet member 1 is to be read out and recorded at a time, the image information can be read out while the sheet member 1 is received into the apparatus at a predetermined speed by selection of the "copy mode" of an operating panel 14c, and can be recorded on output paper 9 which is a recording material. Alternatively, the image information may be read out and recorded when the sheet member 1 is taken out at a predetermined movement speed after it has once been received into the apparatus.

Also, when it is not necessary to record the image information on the sheet member 1, it is possible to change over the sheet member 1 to the operation of simply receiving the sheet member 1 into the apparatus by selection of the "receiving mode" of the operating panel 14c.

Figure 6:
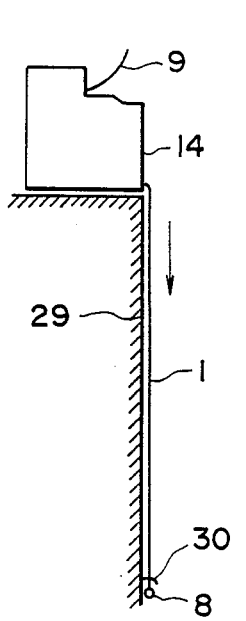
FIGS. 6, 7 and 8 are side views illustrating the forms of use of the board-writing apparatus of the present invention.
Figure 7:
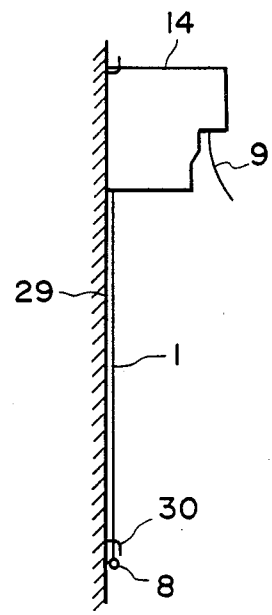
Figure 8:
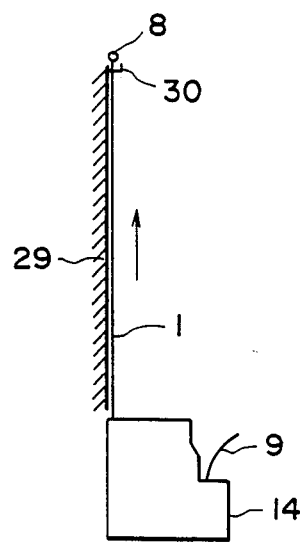
Figure 9:
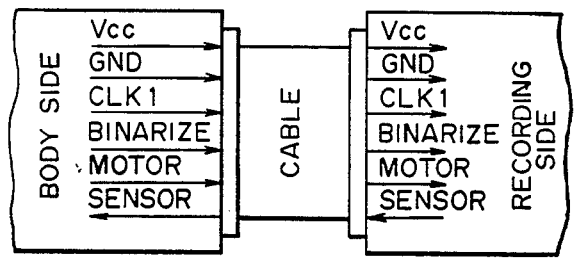
FIGS. 9 and 10 are block diagrams showing the electrical connection between the apparatus body and the recording unit.

Referring now to FIG. 2 which shows a cross-sectional view of the FIG. 1 apparatus taken along line C—C of FIG. 1, one end of the sheet member 1 is fixed to a take-up shaft 4 and the sheet member 1 is wound on the take-up shaft 4 when it is received in the apparatus. When the sheet member 1 is to be used as the board-writing surface, the sheet member 1 is taken out from the take-up shaft 4 by pulling a knob 8 in the direction of arrow A, the knob 8 being provided on the free end of the sheet member 1. The knob 8 is then restrained on a convex member such as a screw or a hook, thereby completing the formation of the board-writing surface. Now, as regards the positional relation between the apparatus body and the taken-out sheet member 1, the body may be placed or hung on the upper portion and the sheet member 1 may be pulled down and fixed relative to the body as shown in FIGS. 6 and 7, or conversely, the sheet member 1 may be pulled up for use relative to the body as shown in FIG. 8. In these figures, reference numeral 29 designates a wall and reference numeral 30 denotes a hook member.

When the image information written on the sheet member thus used as a writing board is to be recorded, a drive roller 5 driven by a motor, not shown, and a follower roller 6 following the drive roller 5 are pressed against each other with a moderate contact pressure so that there is no slippage between them and the sheet member 1. The take-up shaft 4 is rotated by proper transmission of friction with a take-up roller 16 which is driven by the aforementioned motor at a peripheral speed higher than that of the drive roller 5.

In the above-described construction, the take-up of the sheet member 1 is accomplished by said motor being operated to rotate the drive roller 5 and by the take-up roller 16 and take-up shaft 4 being rotated while involving slippage. Thus, the sheet member 1 is wound onto the take-up shaft 4 without slack and received into the apparatus. The material of the sheet member 1 is chosen to a material having a light transmittivity which enables the light transmission type read-out which will be described later. The image information written on the sheet member 1 is read out by the sheet member 1 being illuminated by a light source, such as a fluorescent lamp. The light transmitted therethrough being applied to the light-receiving cell 2a of a well-known one-to-one magnification type read-out sensor 2 proximate to the back of the sheet member 1 which is disclosed in U.S. Pat. Nos. 3,544,713, 4,376,888 or 4,482,804. That is, the image information on the sheet member 1 is successively read out when the sheet member 1 is moved on the one-to-one magnification type read-out sensor 2 as it is taken up onto the take-up shaft 4 and received into the apparatus.

The read-out image information is transformed into electrical signals, which are supplied to a thermal head 10 and successively recorded on thermosensitive recording paper 9 by rotation of a platen roller 12 driven by said motor and having a predetermined peripheral speed, whereafter the recording paper 9 is descharged in the direction of arrow B.

In FIG. 2, reference numeral 7 designates a turn roller which changes over the direction of conveyance of the sheet member 1 from the read-out condition to the outlet 14a of a housing 14. A pinch roller 7a may be provided as required, and one-way rotational clutches are mounted on the rotary support shafts of the follower roller 6 and turn roller 7, whereby manual take-out of the sheet 1 can be facilitated and further, during take-up, the sheet member 1 in a read-out station D can be well kept in a planar state. A light amount detecting sensor 15 for the light source is disposed in the read-out station. The housing 14 is of a volume substantially equal to the taken-up sheet member 1, as shown.

Subsequently, a roller 13 in a recording station E turns and delivers the recorded thermosensitive recording paper 9 to a discharge port 14b. This recording paper 9 is held on a support shaft 11, and is replaced by new one when it is used up.

Control of the operation of the above-described board-writing apparatus will now be explained.

Figure 3:
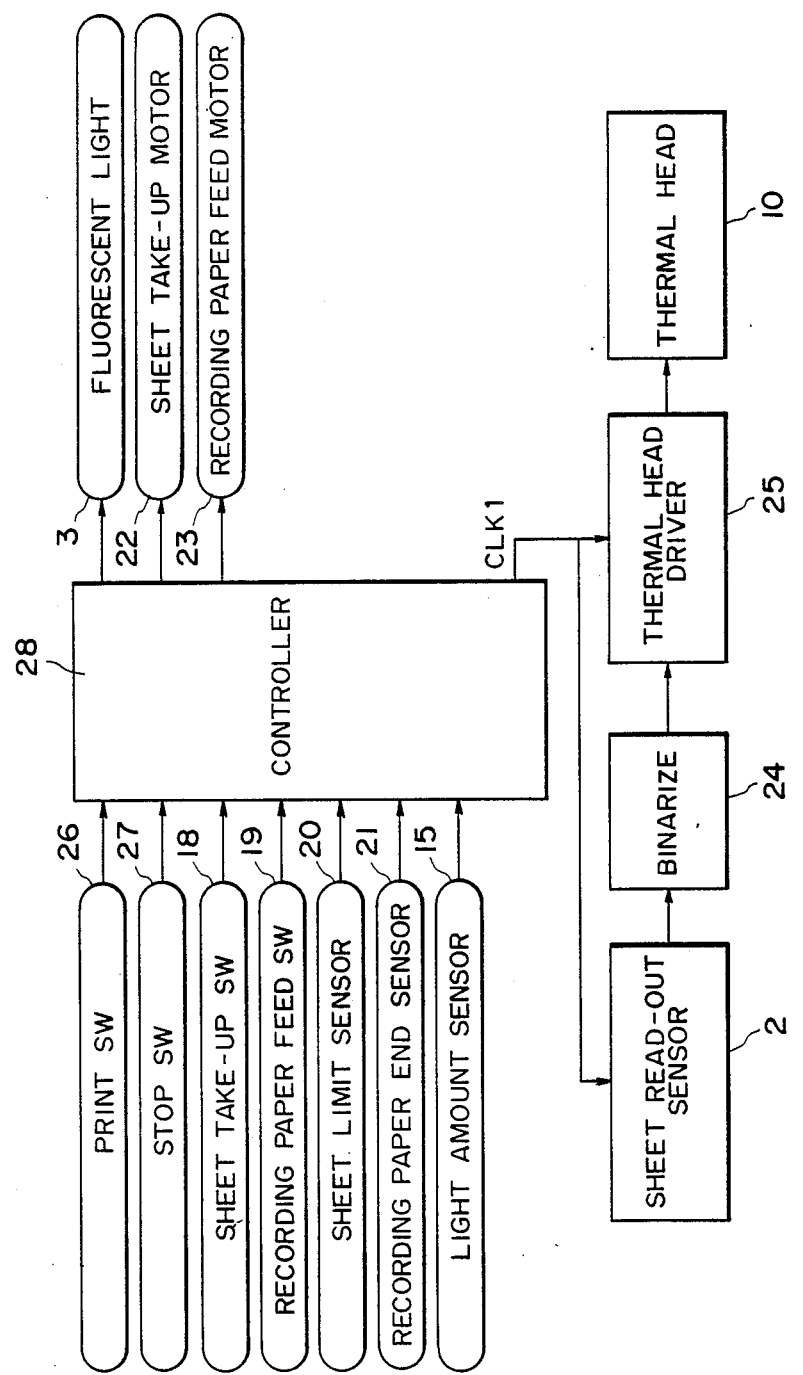
FIG. 3 is a block diagram showing the control circuit construction of the apparatus.

Referring to FIG. 3 which is a block diagram showing the circuit construction, reference numeral 28 designates a controller for controlling the above-described portable board-writing apparatus, reference numeral 26 denotes a start switch (hereinafter referred to as the start SW) for commanding the start of copying of the image information on the sheet member 1, reference numeral 27 designates a stop SW for commanding the stoppage of said copying, reference numeral 18 denotes a sheet take-up SW used to receive the sheet member 1 into the apparatus during the other time than the copying operation, reference numeral 19 designates a feed SW for commanding the idle feed of the thermosensitive recording paper 9, reference numeral 20 denotes a sheet limit sensor for detecting the end of the sheet member 1 during copying or during the receiving operation, reference numeral 21 designates a recording paper end sensor for detecting the end of the recording paper 9, reference numeral 22 denotes a sheet take-up motor for driving the sheet take-up roller 4 when the sheet member is taken up, reference numeral 23 designates a recording paper feed motor for driving the drive roller which delivers the recording paper, reference numeral 24 denotes a binarizing circuit for binarizing the read-out signal from the read-out sensor, and reference numeral 25 designates a thermal head driver for driving the thermal head 10 in accordance with the output of the binarizing circuit. The thermal head driver 25 is in synchronism with a line clock CLK1 output from the controller 28.

Operation will hereinafter be described with reference to the flow charts of FIGS. 4A and 4B and the timing chart of FIG. 5. The power source is first switched on to thereby start operation from FIG. 4A. At step a1, whether the sheet take-up SW is depressed is judged, and if this switch is not depressed, the program skips to step a4, and if the switch is depressed, the program proceeds to the next step. At step a2, whether the sheet limit sensor is ON is judged, and if it is ON, the program skips to step a4, and if it is not ON, the program proceeds to the next step. At step a3, the sheet take-up motor is energized, and the program proceeds to the next step. At step a4, whether the sheet limit sensor is ON is judged, and if it is ON, the program skips to step a6, and if it is not ON, the program proceeds to the next step. At step a5, whether the sheet take-up SW is depressed is judged, and if it is depressed, the program skips to step a7, and if it is not depressed, the program proceeds to the next step. At step a6, the sheet take-up motor is deenergized, and the program proceeds to the next step.

Accordingly, the take-up of the sheet member used when it is received into the apparatus is accomplished by the operation from step a1 to step a6. Further, at step a7, whether the recording paper feed SW is depressed is judged, and if it is not depressed, the program skips to step a10, and if it is depressed, the program proceeds to the next step. At step a8, whether the recording paper end sensor is ON is judged, and if it is ON, the program skips to step a10, and if it is not ON, the program proceeds to the next step. At step a9, the recording paper feed motor is energized, and the program proceeds to the next step. At step a10, whether the paper end sensor is ON is judged, and if it is ON, the program skips to step a12, and if it is not ON, the program proceeds to the next step. At step a11, whether the recording paper feed SW is depressed is judged, and if it is depressed, the program skips to step a13, and if it is not depressed, the program proceeds to the next step. At step a12, the recording paper feed motor is deenergized, and the program proceeds to the next step.

Accordingly, idle feeding of the recording paper is accomplished by the operation from step a7 to step a12.

Further, at step a13, whether the sheet take-up motor is energized is judged, and if it is energized, the program returns to step a1, and if it is not energized, the program proceeds to the next step. At step a14, whether the recording paper feed motor is energized is judged, and if it is energized, the program returns to step a1, and if it is not energized, the program proceeds to the next step. At step a15, whether the sheet limit sensor is ON is judged, and if it is ON, the program returns to step a1, and if it is not ON, the program proceeds to the next step. At step a16, whether the end sensor for the thermosensitive recording paper is ON is judged, and if it is ON, the program returns to step a1, and if it is not ON, the program proceeds to the next step. At step a17, whether the stop SW is depressed is judged, and if it is depressed, the program returns to step a1, and if it is not depressed, the program proceeds to the next step. At step a18, whether the start SW is depressed is judged, and if it is not depressed, the program returns to step a1, and if it is depressed, the program proceeds to the next step.

Accordingly, step a1 to step a18 provide the standby condition, and the subsequent steps provide the operation of copying the image information on the sheet member 1.

Next, at step a19, the light source which is a fluorescent lamp is turned on, and then the program proceeds to the next step, i.e., step a20, where whether the fluorescent lamp has reached a predetermined light amount is judged, and if it has not reached the predetermined light amount, this judgment is repeated, and if it has reached the predetermined light amount, the program proceeds to the next step. This is for accurately accomplishing the read-out after the light amount has reached a stable level. At step a21, the sheet take-up motor is energized, and the program proceeds to the step b1 of FIG. 4B.

Figure 4A:
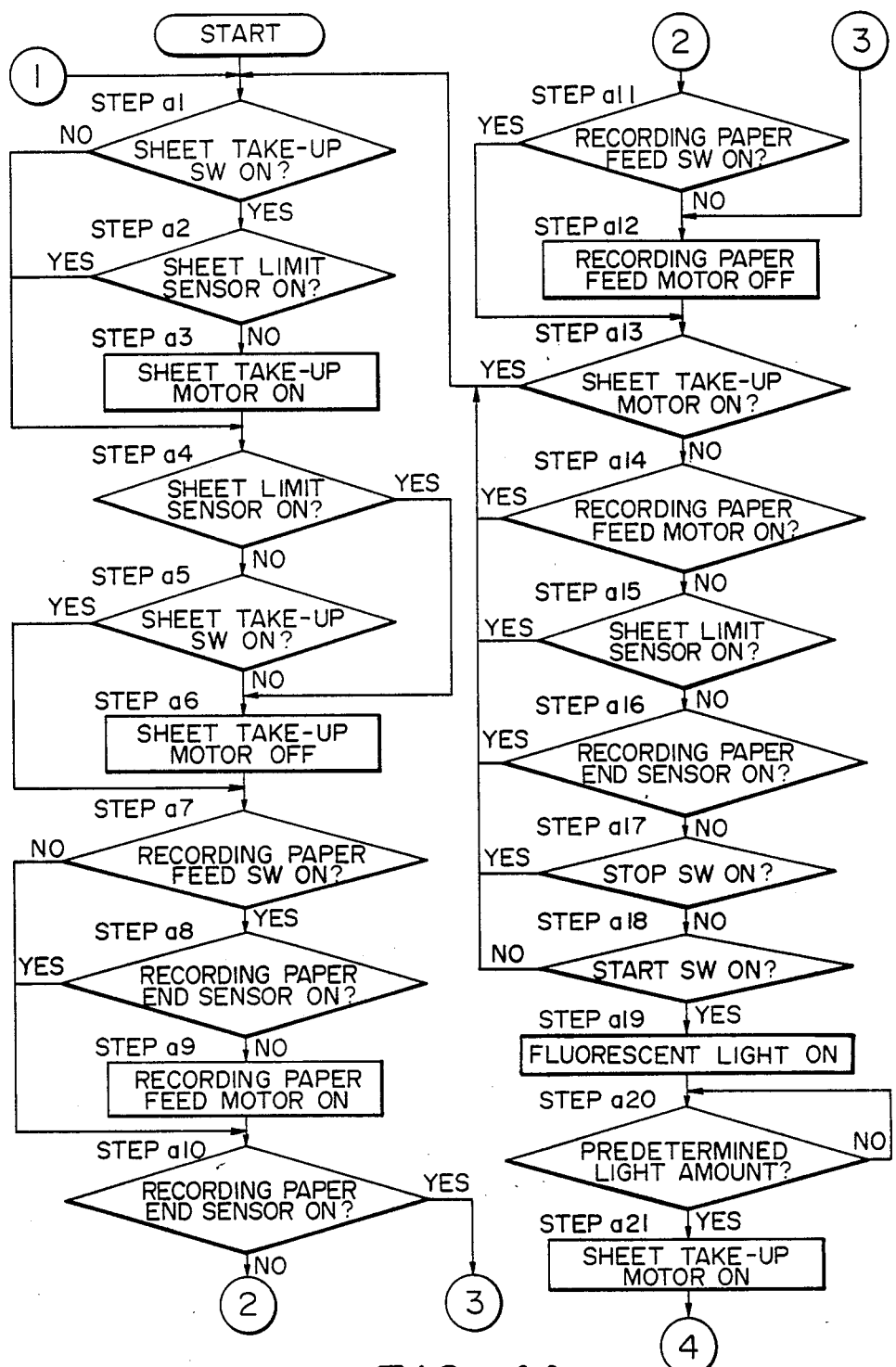
FIGS. 4A and 4B are flow charts of the control system.
Figure 4B:
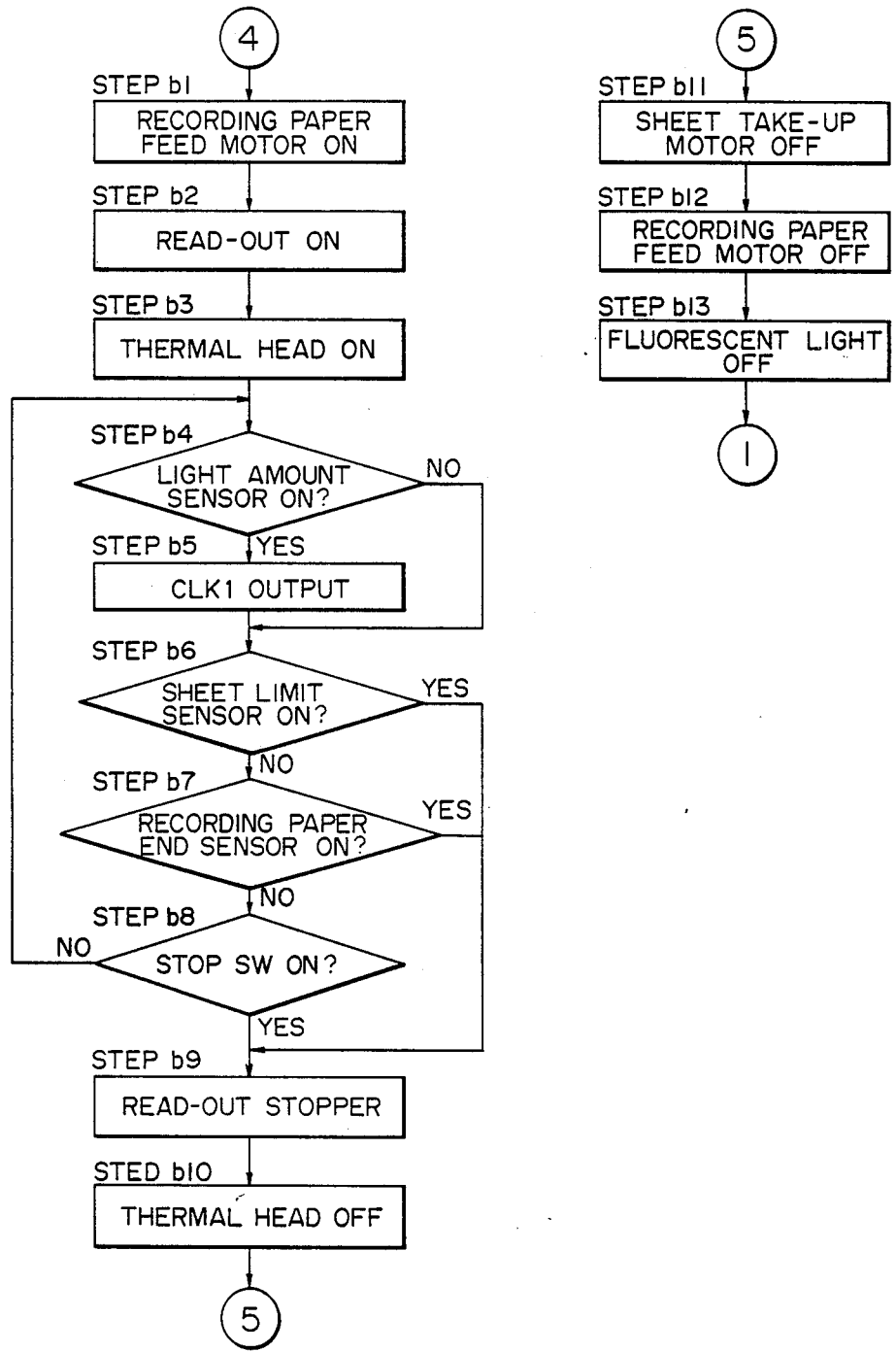

At the step b1 of FIG. 4B, the recording paper feed motor is energized, and the program proceeds to the next step. At step b2, an unshown read-out ON signal rendering the sheet read-out sensor usable is output, and the program proceeds to the next step. At step b3, an unshown thermal head ON signal rendering the write-in operation possible by the thermal head 10 is output, and the program proceeds to the next step. At step b4, whether the light amount detecting sensor is ON is judged, and if it is not ON, the program skips to step b6, and if it is ON, the program proceeds to the next step. At step b5, a signal CLK1 for synchronizing the read-out and write-in lines is output, and the program proceeds to the next step. At step b6, whether the sheet limit sensor is ON is judged, and if it is ON, the program skips to step b9, and if it is not ON, the program proceeds to the next step. At step b7, whether the recording paper end sensor is ON is judged, and if it is ON, the program proceeds to step b9, and if it is not ON, the program proceeds to the next step. At step b8, whether the stop SW is depressed is judged, and if it is not depressed, the program returns to step b4, and if it is depressed, the program proceeds to the next step.

Figure 5:
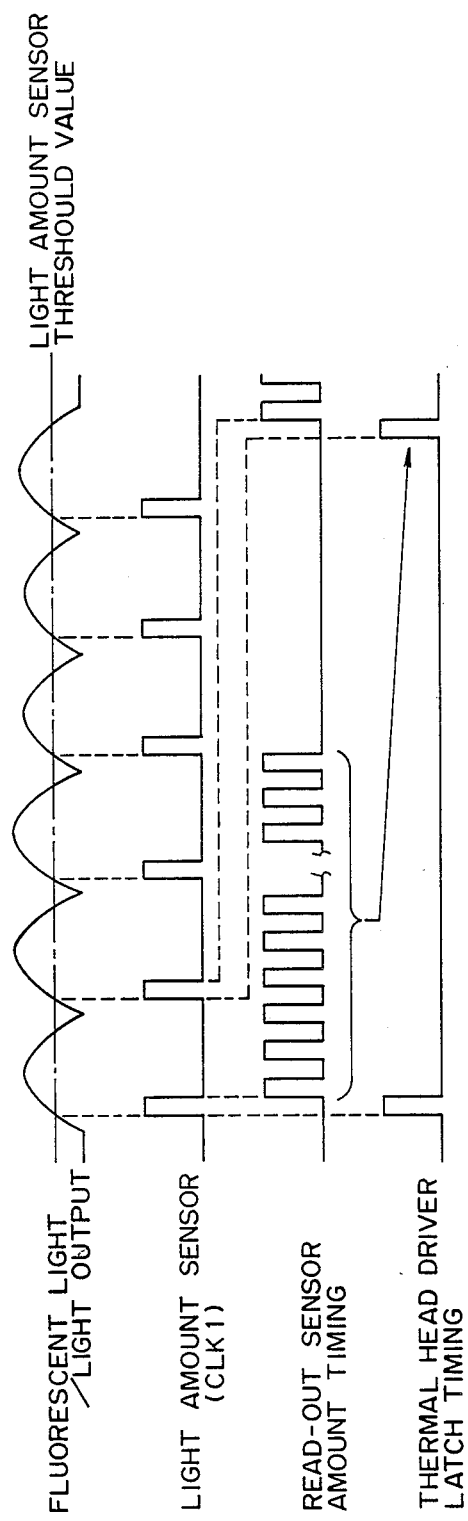

Accordingly, the operation at step b4 to step b5 is such as shown in the timing chart shown in FIG. 5, that is, the light output of the fluorescent light is detected at a predetermined threshold value by the light amount detecting sensor (this is CLK1), the read-out sensor is started at the falling of this output, and the 1-line data of the binarized read-out sensor output sent to the thermal head driver 25 is latched at the rising of the light amount detecting sensor output. Thus, as shown in FIG. 5, read-out and write-in are delayed by an amount corresponding to one clock of CLK1. This operation is repeated until it becomes coincident with the condition of any of step b6 to step b8.

Step b9 disables the read-out, and the program proceeds to the next step b10, where the recording by the thermal head is disabled, and the program proceeds to the next step b11, where the sheet take-up motor is deenergized, and the program proceeds to the next step b12, where the feed motor for the recording paper 9b is deenergized, and the program proceeds to the next step b13, where the fluorescent light is turned off, and the program returns to the step a1 of FIG. 4A.

According to the above-described embodiment, the sheet member 1 can be taken up and received in the apparatus body and therefore, the entire apparatus can be made compact and becomes readily portable. Also, the sensor for reading out the image information on the sheet member 1 is a transmission type one-to-one magnification sensor and therefore, the application efficiency of the illuminating light is high, and the read-out sensor is disposed on the side opposite to the write-in side for the sheet member 1, whereby the image by the writing o the sheet member 1 is not disturbed during read-out.

In the above-described embodiment, the transmission read-out type using the one-to-one magnification type read-out sensor has been mentioned as the read-out means, but a reflection one-to-one magnification type read-out sensor may also be used. Further, in the above-described embodiment, the sheet take-out means has been of the manually operated type, but automation of the sheet take-out operation is made possible by means such as endowing the roller 7 with a drive force.

Next, as regards the recording means, thermosensitive recording is employed in the above-described embodiment, but any of digital signal recording means such as thermosensitive transfer, power supply thermosensing and ink jet ma also be possible. In the above-described embodiment, the recording means is of the recording type using digital signals, but the analog type such as electrophotography is also possible. Further, as far as recording is concerned, in the above-described embodiment, the receiving means is of the automatic take-up type, but the manual type using extraneous operation is also possible, and in such case, take-out is automatically effected and the written-in images on the sheet member are read out during the take-out. Also, the output paper has been shown in the form of a roll, but may also be in the form of cut sheets.

Figure 10:
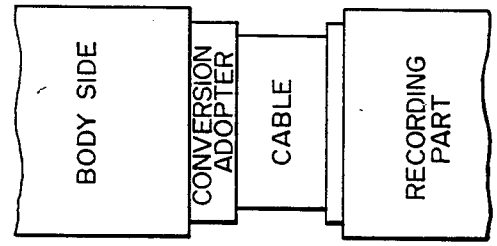

Also, in the above-described embodiment, an apparatus in which the recording means using the thermal head 10 is supported as a unit has been illustrated. That is, the thermal head driver 25 and thermal head 10 shown in FIG. 3 together constitute a basic recording unit. Accordingly, the present embodiment has an interface for receiving and delivering between it and the recording unit side in the apparatus body the CLK1 signal, the binarized output from the binarizing unit 24, the drive signal of the recording paper feed motor 23 and the output signal from the recording paper end sensor 21 which is sent from the recording unit. However, it is also possible to leave only such an interface in the apparatus body and to construct the recording unit independently of the apparatus body. In such case, if the recording unit is of centronics specification or RS232C specification as shown in FIG. 10, the recording unit will be connected to the apparatus body through a conversion adapter corresponding to either of these styles.

Figure 21:
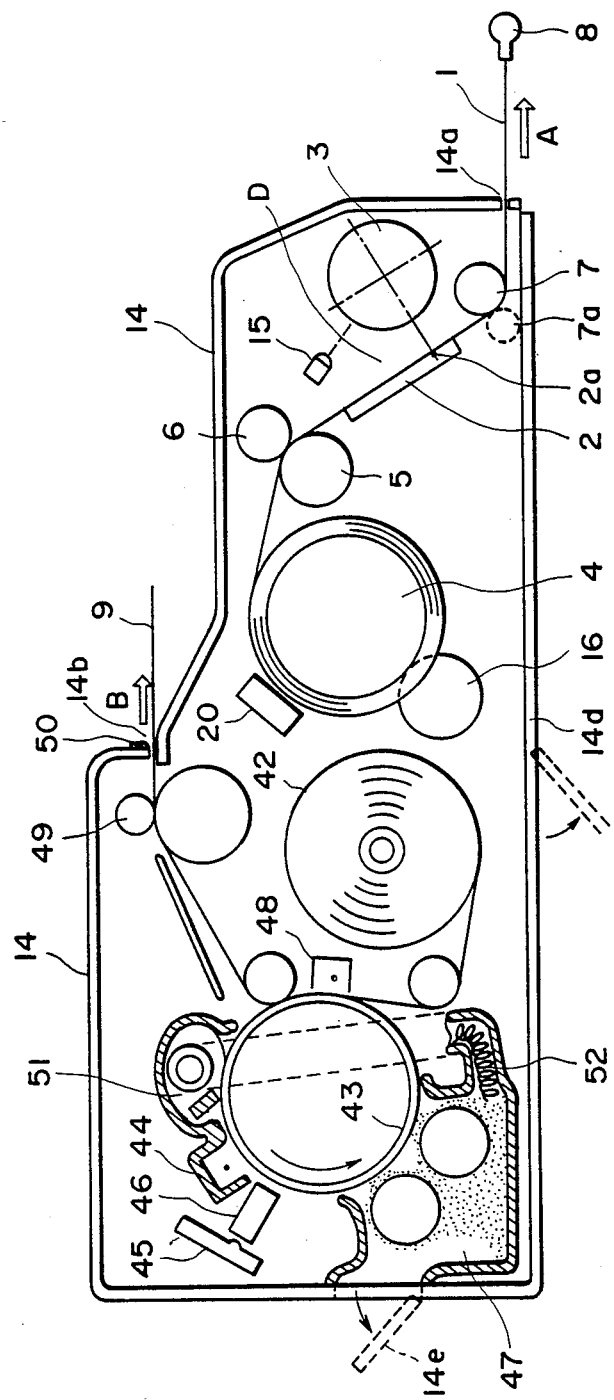
FIG. 21 is a cross-sectional view showing another embodiment of the printer means of the present invention.

FIG. 21 shows a cross-sectional view of a board-writing apparatus adopting as printer means a system whereby output is provided to a transfer material 42 which is a roll of plain paper.

In FIG. 21, an electrophotographic photosensitive drum 43 rotated in the direction of arrow is uniformly charged by a charger 44. Thereafter, the image information on the sheet member 1 converted into electrical signals by the read-out head 2 is output as light information by an LED head 45, is imaged on the drum 43 through a short-focus lens array 46 and forms an electrostatic latent image. This latent image is developed by a well-known developing device 47 with the aid of magnetic pressure fixation toner and transferred onto the transfer material 42 by a transfer discharger 48. Thereafter, the transfer material 42 is discharged out of the apparatus through a pressure fixing device 49, and is suitably cut for utilization by a fixed cutter 50 as required. On the other hand, any residual toner on the photosensitive drum 43 is removed by a cleaning device 51 and thus becomes ready for another image formation process.

The cleaning device 51 and the developing device 47 are connected together by a pipe and toner conveying means 52 which is a screw therein, and the toner collected by the cleaning device 51 is returned into the developing device by the conveying means 52. On the other hand, interchange of the transfer material 42 and replenishment of toner may be done by opening the portions 14d and 14e of the housing of the apparatus body.

In the present embodiment, movement of the sheet member 1 during read-out is at a predetermined speed by rollers, but read-out not at the predetermined speed will also be possible by the provision of means for detecting the distance of movement of the sheet member. Also, both of take-up and take-out may be accomplished manually. As the means for detecting the indefinite speed or the speed of movement of the sheet member 1 by manual operation, it would occur to mind to provide fine markings provided with predetermined gaps on the end portion of the sheet member and read them by a photocoupler, or to detect the angle of rotation of the drive roller for the sheet member by an encoder.

As described above, by reading out the image information written on the board-writing member in the operation of winding the board-writing member into the apparatus body, and automatically taking out or winding the board-writing member, it has become possible to make the board-writing apparatus compact and easily portable and wider in the range of use.

Figure 11:
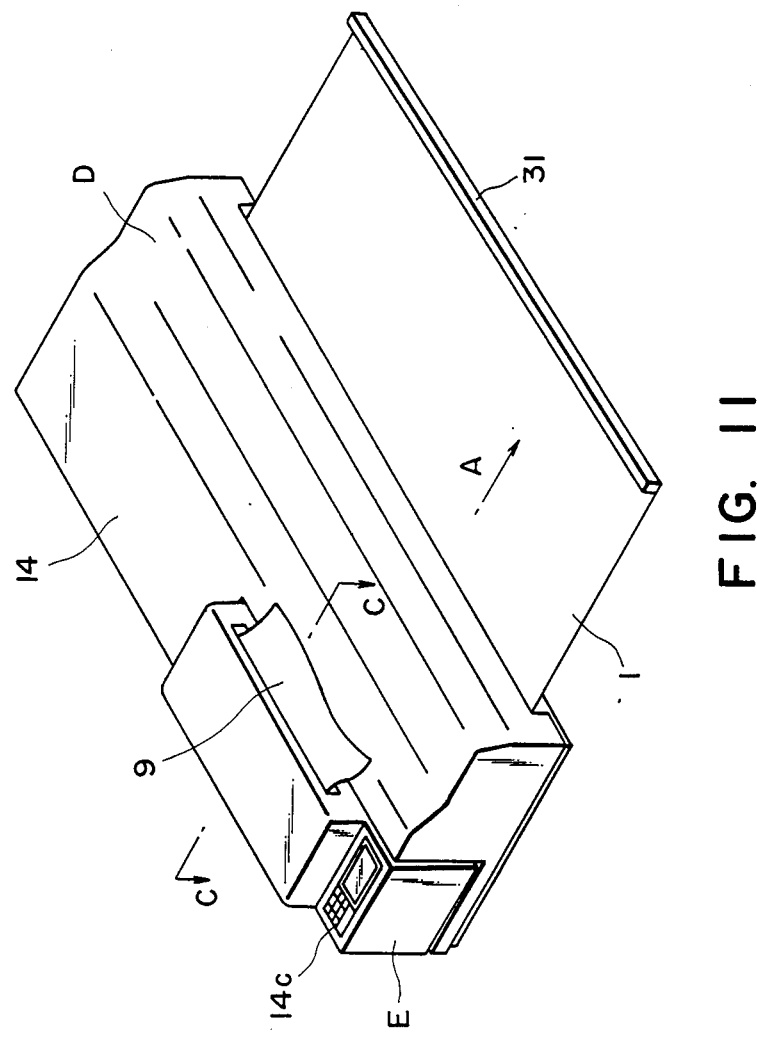
FIG. 11 is a pictorial perspective view of an apparatus according to another embodiment of the present invention.
Figure 12C:
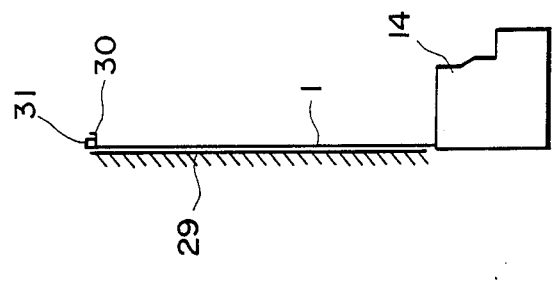
FIGS. 12A to 12C illustrate the forms of use of the apparatus.
Figure 12B:
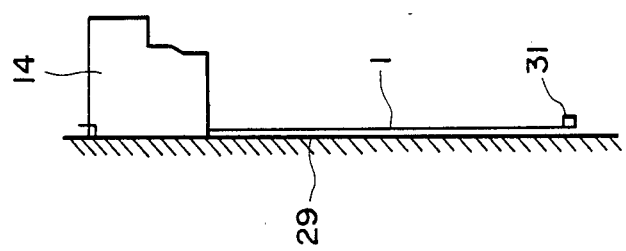
Figure 12A:
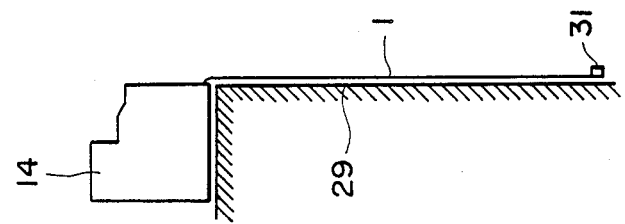
Figure 13:
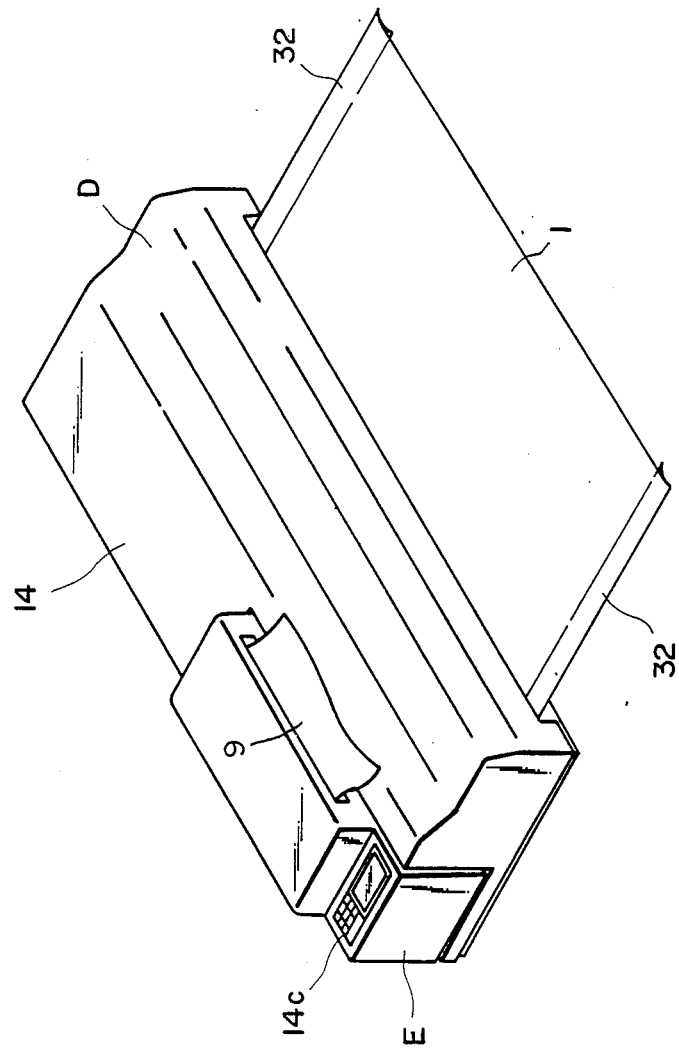
FIG. 13 is a perspective view of another embodiment of the present invention.

Reference is now had to FIGS. 11 to 13 to describe a construction for preventing the sheet member in the apparatus of FIG. 1 from being curled due to its bending habit when the sheet member is drawn out of the apparatus.

FIG. 11 is a perspective view of a board-writing apparatus to which the present invention is applied, and FIGS. 12A–C show the apparatus as it is used.

In FIG. 11, a metal weight member 31 having a weight which will not hinder the take-up or draw-out of the sheet member 1 is attached to the free end of the sheet member 1. Thus, if the sheet member 1 is drawn in the direction of arrow A and taken out from the take-up shaft 4 (FIG. 2) when the sheet member 1 is used as a write-in surface, curling of the sheet member is prevented by the weight member 31 and the write-in surface is maintained planar even if the sheet member has a bending habit.

Where the sheet member 1 is taken out for use, the apparatus body 14 may be placed on a pedestal 29 or hung on a wall as shown in FIG. 12A and 12B and the sheet member 1 may be pulled down below the body 14 and fixed. In such case, tension is applied to the sheet member 1 due to the weight of the weight member 31 and thus, curling of the sheet member does not occur. The sheet member may not only be pulled down, but also may be pulled up relative to the body 14 as shown in FIG. 12C with the weight member 31 being hung on a hook member 30.

In the above-described embodiment, the means for preventing curling of the sheet member 1 is constituted by the weight member 31, but alternatively, a construction as shown in FIG. 13 may be adapted.

This construction comprises support members 32 of arcuate cross-section formed of resin or steel having resiliency and attached to the opposite side edges of the back of the sheet member 1. With such a construction, the support members 32 assume an arcuate shape to prevent curling of the sheet member 1 when the sheet member 1 is drawn out. Also, when the sheet member 1 is to be taken up, pressure is applied to the arcuate portions of the support members 32 to thereby make the support members 32 planar when the sheet member passes the outlet 14a and when the sheet member is wound on the take-up shaft 4. Accordingly, the sheet member 1 becomes readily bendable and is taken up on the take-up shaft 4.

In the above-described construction, unlike the previous embodiment, the weight member 31 is not employed and therefore, the take-up torque of the motor can be reduced and the take-up space can also be reduced.

In the present embodiment, as described above, when the sheet member is drawn out and image information is written on the surface thereof and the sheet member is then received into or taken out from the apparatus, the image information can be read out and transferred and also, the drawn-out sheet member is maintained planar by the curling preventing means, whereby the write-in performance can be improved.

The installation of the above-described board-writing apparatus will now be described with respect to an embodiment thereof.

Figure 14:
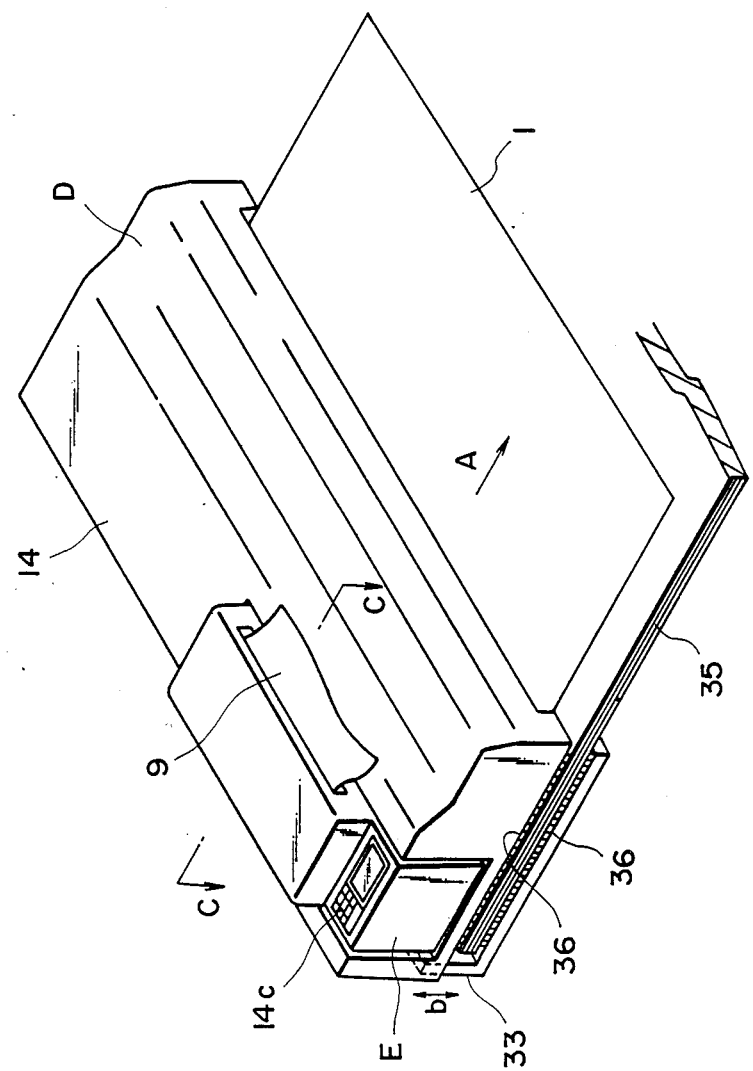
FIG. 14 is a pictorial perspective view of the apparatus.
Figure 15:
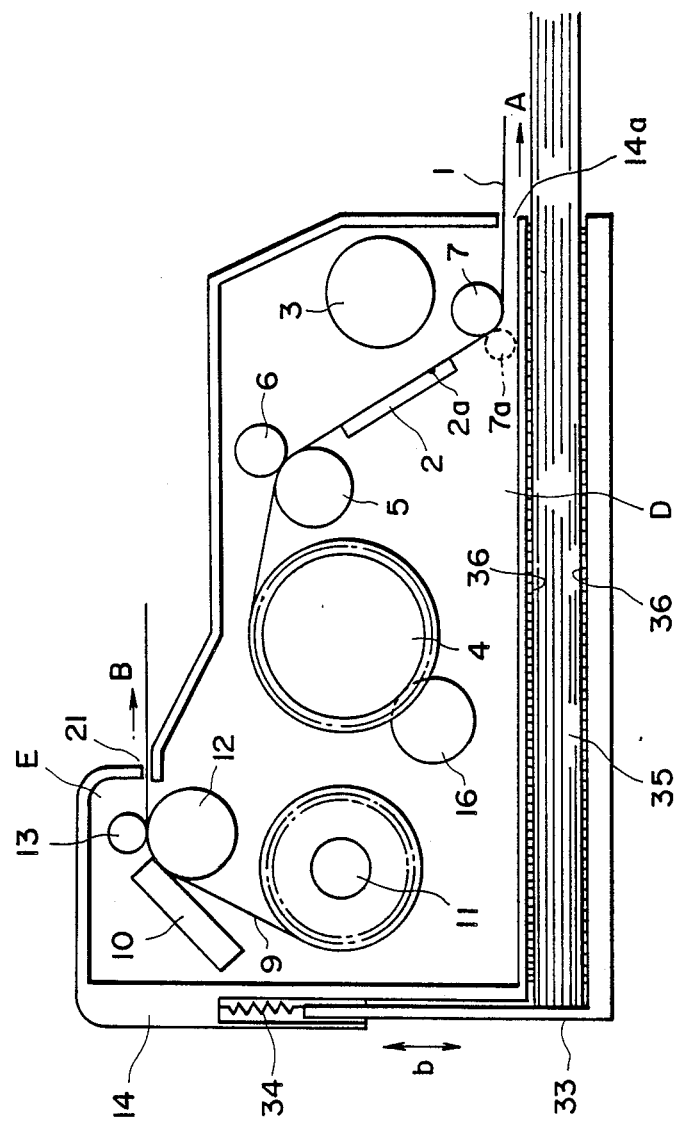
FIG. 15 is a cross-sectional view taken along line C—C of FIG. 14.

FIG. 14 is a pictorial perspective view of an embodiment of the present invention, and FIG. 15 is a cross-sectional view taken along line C—C of FIG. 14.

A hook-shaped fixing member 33 is mounted to the back surface portion of the apparatus body 14 for sliding movement in the direction of arrow b and against falling off, and a tension spring 34 is mounted between one end of the fixing member 33 and the apparatus body 14 so that the fixing member 33 is pulled toward the bottom surface of the apparatus body 14. Accordingly, a top plate 35 is held by and between the apparatus body 14 and the fixing member 33, whereby the apparatus body 14 is fixed to the top plate 35. Anti-slippage members 36 formed of rubber or the like may be provided on the surfaces of the apparatus body 14 and fixture 35 which are in contact with the top plate, as required.

Figure 16:
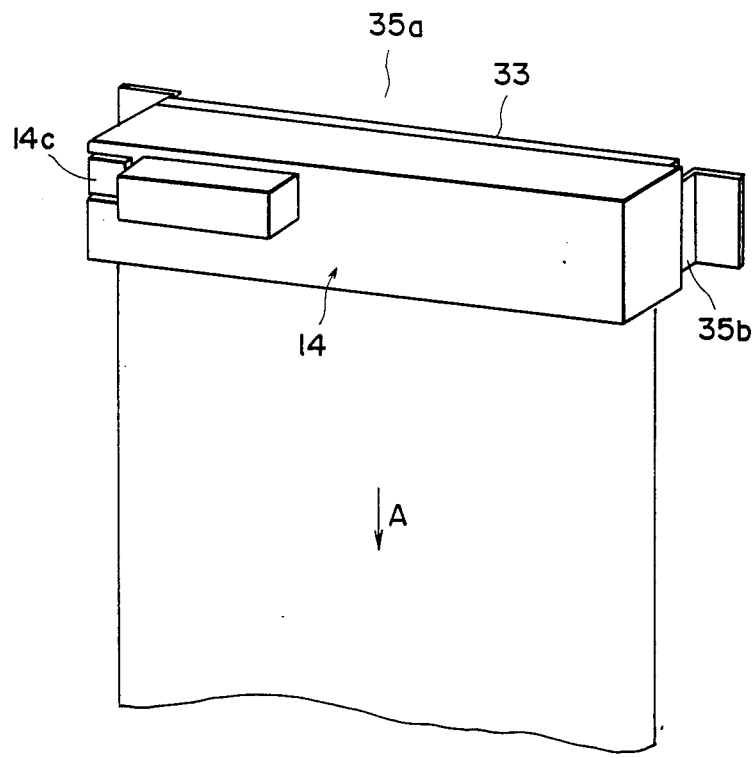
FIG. 16 illustrates the apparatus as it is hung on a side wall for use.

Now, when image information is to be written on the sheet member 1, the apparatus body 14 is fixed to the top plate 35 by the fixing member 33, or as shown in FIG. 16, the fixing member 33 is hung on a metal fitting 35b of U-shaped cross-section attached to a wall surface 35a to thereby fix the apparatus body 14 to the wall surface 35a, and the sheet member 1 is drawn out in the direction of arrow A by gripping the free end portion of the sheet member to thereby form an image write-in surface, and a predetermined image is written on that surface by means of a pen or the like.

According to the above-described embodiment, the information written on the sheet member 1 can be read out and recorded and the apparatus body 14 is fixed to the top plate 35 or the wall surface 35a by the fixing member 33. Therefore, the operability during the draw-out of the sheet member 1 is improved, and where the apparatus is used on a desk, unexpected falling of the apparatus can be prevented.

Figure 17A:
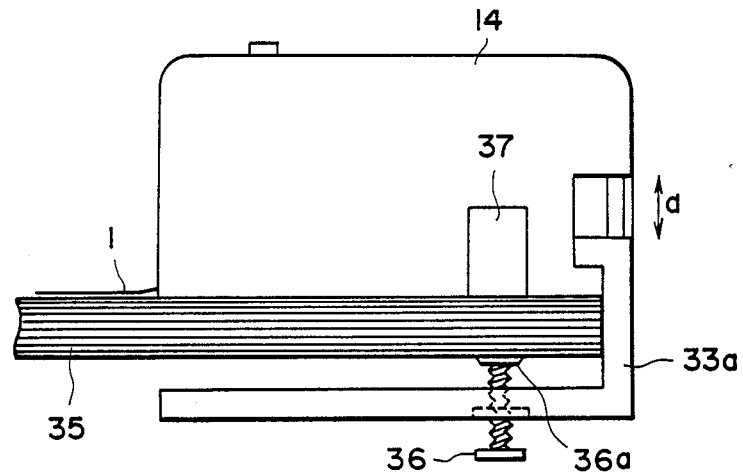
FIGS. 17A to 17C are cross sectional views of further embodiments.
Figure 17B:
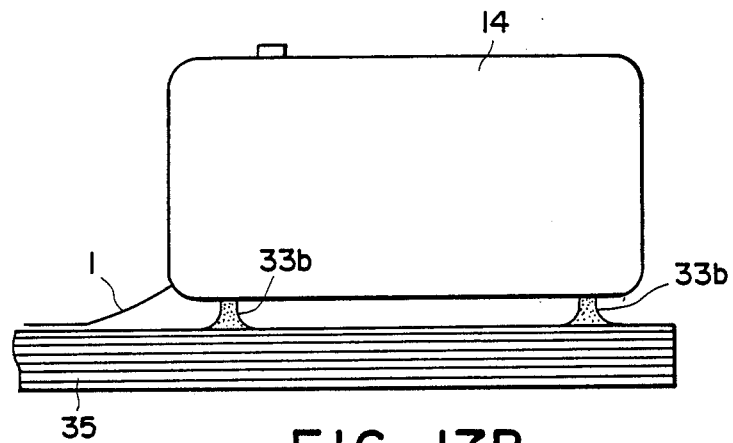

In the above-described embodiment, the hook-shaped fixing member 33 as the fixing means for the apparatus body 14 is designed to be capable of being pressed against the bottom surface of the apparatus body by the tension spring 34, but alternatively, the fixing means may be constructed as shown in FIG. 17.

First, in the construction of FIG. 17A, a hook-shaped fixing member 33a is mounted to the back surface of the apparatus body 14 for sliding movement in the direction of arrow d and against falling off, a fastening screw 36 is attached to a predetermined location on the bottom surface of the fixing member 33a, and a keep plate 36a is attached to the end of the fastening screw 36. According to such construction, by threading the fastening screw 36 forwardly, the top plate 35 can be held by and between the keep plate 36a and the bottom surface of the apparatus body to thereby fix the apparatus body 14 to the top plate 35. In FIG. 17A, reference numeral 37 designates a receiving hole for containing the fastening screw 36 in the apparatus body 14 when the apparatus is not fixed to the top plate 35.

Next, in the construction of FIG. 17 B , fixing members 33b each comprising a suction cup are provided on the bottom surface of the apparatus body 14. In this construction, the suction cups 33b are adsorbed to the surface of the top plate or the like to thereby fix the apparatus body 14.

Figure 17C:
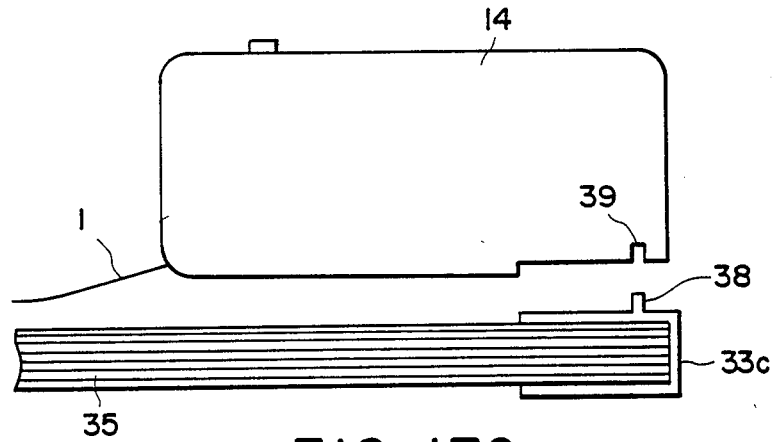

Further, FIG. 17C shows a construction in which the apparatus body 14 and fixing member 33c are separate from each other. That is, the fixing member 33c may be formed into a U-shape and made fixable to the top plate 35 and a convex (or concave) portion 38 may be provided in the upper surface thereof, and a concave (or convex) portion 39 capable of mating with the convex (or concave) portion 38 may be provided in the bottom surface of the apparatus body 14 so that by these portions 38 and 39 mating with each other, the apparatus body 14 may be fixed to the top plate 35.

Further various means such as using a magnet may be employed as the means for fixing the apparatus body 14 to the top plate 35 or the like.

The apparatus body is fixed to the top plate or the like by the use of the fixing member as described above. Therefore, the operability when the sheet member is drawn out is improved, and the apparatus may not fall by mistake even when it is used on a desk.

Description will now be made of another embodiment of the method of reading out the image information on the sheet member 1. Here, read-out is enabled with one of the take-up or the take-out of the sheet member being designated.

Thus, in the present embodiment, the image information written on the sheet member 1 is read out by the read-out sensor 2 when the sheet member 1 is taken up and taken out. The apparatus construction in this case may be the same as that of FIGS. 1 and 2, and will hereinafter be described with reference to these figures and FIGS. 18 to 20.

In the above-described construction, the take-up of the sheet member 1 is accomplished by the motor being operated to rotate the take-up roller 5, and the drive roller 16 and the take-up shaft 4 being rotated while involving slip. Thus, the sheet member 1 is taken up onto the take-up shaft 4 without slack an received into the apparatus body 14.

Also, the construction for taking out the sheet member 1 is such that a take-out roller 7 rotatively driven in a counter-clockwise direction by a motor, not shown, and a follower roller 7a following the take-out roller 7 are pressed against with each other with a moderate contact pressure against slippage with respect to the sheet member 1 and the sheet member 1 is taken out by the coaction of the two rollers 7 and 7a.

The take-up roller 5 and the take-out roller 7 each are provided with one-way clutch, for example, so that when one of these rollers is rotatively driven, the other roller is idly rotated.

Figure 18A:
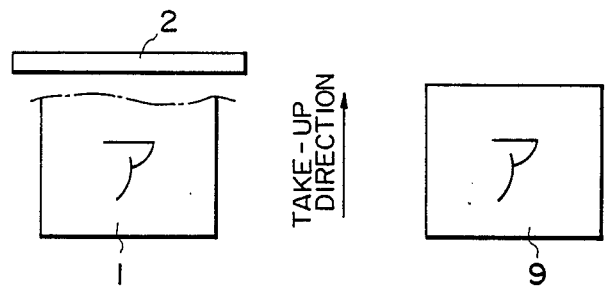
FIGS. 18A and 18B illustrate a case where the read-out data read out when the sheet member is taken up and taken out is recorded without being rearranged.
Figure 18B:
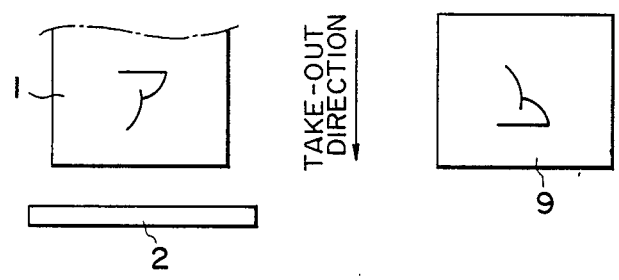

Now, the image information read out in the manner described above is converse in the read-out direction between the time of sheet take-up (for example, a first direction) and the time of sheet take-out (a second direction opposite to the first direction) and therefore, the respective read-out data are inverted with respect to each other. Thus, if the read-out data are transmitted intact to the recording means and recorded, assuming that the case where the read-out data when the sheet member 1 is taken up as shown in FIG. 18A is recorded is the forward rotation image, where the read-out data when the sheet member 1 is taken out as shown in FIG. 18B is recorded, the recorded data is an inverted image which is in a mirror image relationship with the forward rotation image.

Figure 19:
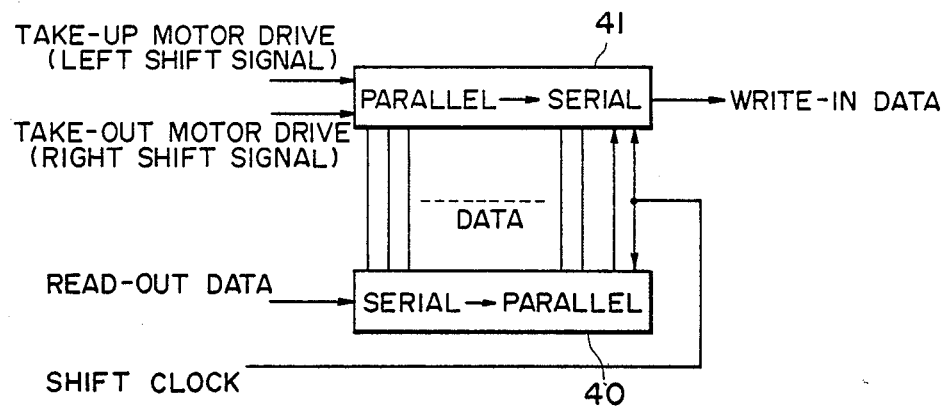
FIG. 19 illustrates a data rearranging construction.
Figure 20:
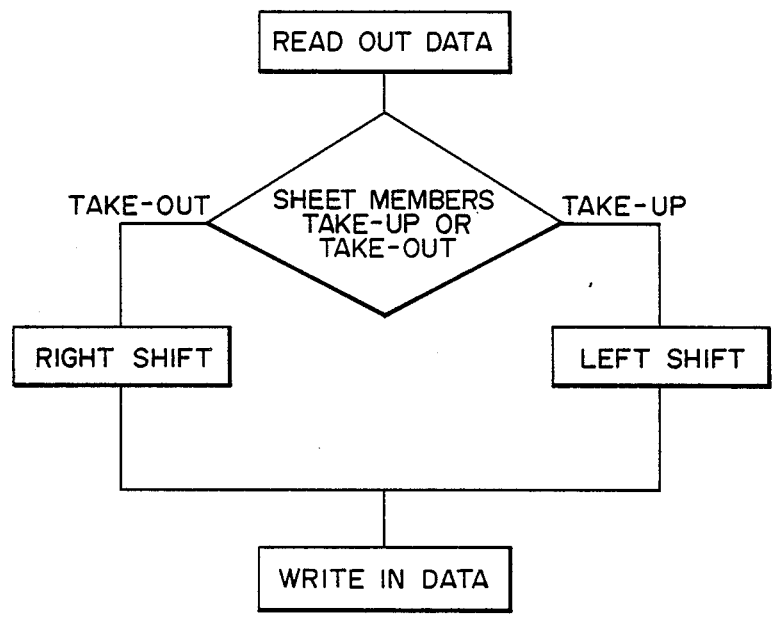

In the present embodiment, the read-out data of the inverted image is rearranged by memory means, and modified into a forward rotation image and then transmitted to the recording means. Describing the construction therefor, as shown in FIG. 19, the read-out data is transmitted from a shift register 40 to a bidirectional shift register 41, and further transmitted as write-in data to the thermal head. The shift register 40 receives the read-out data as a serial input, and when a data corresponding to one line is input thereto, it parallel-outputs the data to the bidirectional shift register 41. The bidirectional shift register 41 serial-outputs the parallel input as write-in data to the thermal head by right shift or left shift.

A shift clock is input to the shift registers 40 and 41, which shift the data in response to the clock. The direction of shift of the bidirectional shift register 41 is controlled by a shift control signal, which in turn is controlled by the driving of the take-up motor and take-out motor. That is, when the take-up motor drives (during the sheet take-up), a left shift control signal is transmitted to output the data in left shift, and when the take-out motor drives (during the sheet take-out), a right shift control signal to transmitted to output the data in right shift.

The data (forward rotation image) read out when the sheet member 1 is taken up in the manner described above is intactly output in left shift. On the other hand, the data (inverted image) read out when the sheet member 1 is taken out is output after the data is rearranged and modified into a forward rotation image by changing the direction of shift to the right shift.

The data output from the memory means are then supplied as image signals to the thermal head 10 shown in FIG. 2, and are successively recorded on the thermosensitive recording paper 9 paid away by the platen roller 12 rotatively driven at a predetermined peripheral speed by a motor, not shown, and the recording paper 9 after the recording is turned and discharged rightwardly from the discharge port 14b by the discharge roller 13.

According to the above-described embodiment, the information written on the sheet member 1 can be read out and recorded both during the take-up and the take-out of the sheet member 1 and therefore, recording on a plurality of sheets can be accomplished within a short time and with a small memory capacity.

In the above-described embodiment, the rearrangement of the read-out data has been accomplished by changing the direction of shift of the bidirectional shift register, but it is also possible by any other construction which has a memory capacity corresponding to one line or more. For example, a CPU (central processing unit) may be used to process by software, or an address generator capable of up and down may be used to rearrange the data.

Also, in the above-described embodiment, the take-up and take-out of the sheet member 1 and further the driving of the platen roller 12 are effected by discrete motors, but alternatively, a drive transmission system may be provided to thereby permit the use of a single motor for these purposes.

As described above, image information is written on the sheet member. The image information is read out with the sheet member reciprocally moved relative to the read-out means, and when the read-out data is an inverted image, it is rearranged and modified into a forward rotation image and then transmitted to the recording means. Therefore, recording is possible during the reciprocal movement of the sheet member and recording on a plurality of sheets is possible within a short time and with a small memory capacity.

What we claim is:

1. A board-writing apparatus for outputting image information onto a recording material, said board-writing apparatus comprising:

a sheet member having one end as a free end;

sheet member supporting means for supporting said sheet member such that said sheet member can be moved between a first position in which the other end of said sheet member is wound into and supported on a receiving portion of the body of said apparatus and a second position in which said sheet member is located outside the body of said apparatus and in which said sheet member is accessible for having image information written onto said sheet member;

read-out means disposed facing a path of movement of said sheet member, for reading out the image information on the sheet member as said sheet member is moved and for converting the image information into an electrical signal; and means for recording the image information on the recording material on the basis of said electrical signal, wherein said means for recording is a printer for outputting the image information reach out by said read-out means, and wherein said printer is integral with the body of said board-writing apparatus.

2. A board-writing apparatus for outputting image information onto a recording material, said board-writing apparatus comprising:

a sheet member having one end as a free end;

sheet member supporting means for supporting said sheet member such that said sheet member can be moved between a first position in which the other end of said sheet member is wound into and supported on a receiving portion of the body of said apparatus and a second position in which said sheet member is located outside the body of said apparatus and in which said sheet member is accessible for having image information written onto said sheet member;

read-out means disposed facing a path of movement of said sheet member, for reading out the image information on the sheet member as said sheet member is moved and for converting the image information into an electrical signal; and means for recording the image information on the recording material on the basis of said electrical signal, wherein said means for recording is a printer for outputting the image information read out by said read-out means, and wherein said printer is removably mountable with respect to the body of said board-writing apparatus and is supported integrally with said body.

3. A board-writing apparatus for outputting image information onto a recording material, said board-writing apparatus comprising:

a sheet member having one end as a free end;

sheet member supporting means for supporting said sheet member such that said sheet member can be moved between a first position in which the other end of said sheet member is wound into and supported on a receiving portion of the body of said apparatus and a second position in which said sheet member is located outside the body of said apparatus and in which said sheet member is accessible for having image information written onto said sheet member;

read-out means disposed facing a path of movement of said sheet member, for reading out the image information on the sheet member as said sheet member is moved and for converting the image information into an electrical signal; and means for recording the image information on the recording material on the basis of said electrical signal, wherein a member for preventing the curling of said sheet member is attached to the free end of said sheet member, and wherein said member for preventing the curling of said sheet member is a weight extending in a direction orthogonal to a direction of movement of said sheet member.

4. A board-writing apparatus for outputting image information onto a recording material, said board-writing apparatus comprising:

a sheet member having one end as a free end;

sheet member supporting means for supporting said sheet member so that said sheet member can be moved between a first position in which the other end of said sheet member is wound into and supported on a receiving portion of the body of said apparatus and a second position in which said sheet member is located outside the body of said apparatus and in which said member is accessible for having image information written onto said sheet member;

read-out means disposed facing a path of movement of said sheet member, for reading out the image information on said sheet member by movement of said sheet member during rewinding or taking-out of said sheet member and converting the image information into an electrical signal;

means for storing the electrical signal;

means for rearranging and inverting the read-out data by processing the electrical signal stored in said storing means, and for outputting the inverted data; and means for recording the image information reach out by said read-out means.

5. An apparatus according to claim 4, wherein said means for recording is a printer for outputting the image information read out by said read-out means.

6. An apparatus according to claim 4, wherein said means for recording is an interface for outputting the image information reach out by said read-out means to a printer.

7. An apparatus according to claim 4, wherein said rearrangement is accomplished by data being read in by bidirectional shift register means and the read-in data being serial-output by right shift or left shift.

* * * * *

UNITED STATES PATENT AND TRADEMARK OFFICE
CERTIFICATE OF CORRECTION

PATENT NO. : 4,924,319

DATED : May 8, 1990

INVENTOR(S) : YOSHITAKA OGINO, ET AL.

It is certified that error appears in the above-identified patent and that said Letters Patent is hereby corrected as shown below:

IN THE DRAWINGS,

SHEET 5 OF 17

FIG. 4B, "STED b10" should read --STEP b10--.

SHEET 6 OF 17

FIG. 5, "THRESHOULD" should read --THRESHOLD--.

SHEET 7 OF 17

FIG. 10, "CONVERSION ADOPTER" should read --CONVERSION ADAPTER--.

COLUMN 2

Line 45, "a" should be deleted.
Line 47, "in" (first occurrence) should read --on--.

COLUMN 3

Line 37, "to" should read --from--.
Line 41, "lamp." should read --lamp,--.
Line 42, "The" should read --the--.
Line 57, "descharged" should read --discharged--.

COLUMN 6

Line 40, "o" should read --on--.
Line 54, "ma" should read --may--.

UNITED STATES PATENT AND TRADEMARK OFFICE
CERTIFICATE OF CORRECTION

PATENT NO. : 4,924,319
DATED : May 8, 1990
INVENTOR(S) : YOSHITAKA OGINO, ET AL.

It is certified that error appears in the above-identified patent and that said Letters Patent is hereby corrected as shown below:

COLUMN 10

Line 26, "an" should read --and--.

COLUMN 11

Line 10, "to" (first occurrence) should read --is--.

COLUMN 12

Line 15, "reach" should read --read--.

COLUMN 14

Line 10, "reach" should read --read--.
Line 17, "reach" should read --read--.

Signed and Sealed this

First Day of October, 1991

Attest:

HARRY F. MANBECK, JR.

Attesting Officer

Commissioner of Patents and Trademarks